(12) United States Patent
Yin

(10) Patent No.: US 12,001,275 B2
(45) Date of Patent: Jun. 4, 2024

(54) DATA PROCESSING METHOD, APPARATUS, DATABASE SYSTEM, ELECTRONIC DEVICE, AND STORAGE MEDIUM

(71) Applicant: Alibaba Group Holding Limited, Grand Cayman (KY)

(72) Inventor: Zheng Yin, Hangzhou (CN)

(73) Assignee: Alibaba Group Holding Limited, George Town (KY)

( * ) Notice: Subject to any disclaimer, the term of this patent is extended or adjusted under 35 U.S.C. 154(b) by 39 days.

(21) Appl. No.: 17/861,134

(22) Filed: Jul. 8, 2022

(65) Prior Publication Data

US 2022/0342741 A1  Oct. 27, 2022

Related U.S. Application Data

(63) Continuation of application No. PCT/CN2021/072596, filed on Jan. 19, 2021.

(30) Foreign Application Priority Data

Jan. 23, 2020  (CN) .......................... 202010077017.2

(51) Int. Cl.
 *G06F 11/00* (2006.01)
 *G06F 11/07* (2006.01)
 (Continued)

(52) U.S. Cl.
 CPC ........ *G06F 11/079* (2013.01); *G06F 11/0727* (2013.01); *G06F 11/0769* (2013.01);
 (Continued)

(58) Field of Classification Search
 CPC ............. G06F 11/0727; G06F 11/0772; G06F 11/079; G06F 11/327; G06F 16/215
 See application file for complete search history.

(56) References Cited

U.S. PATENT DOCUMENTS

| 7,251,584 B1 * | 7/2007 | Perazolo | ............... G06F 11/008 |
| | | | 702/182 |
| 10,402,255 B1 * | 9/2019 | Niyogi | .................. G06F 11/079 |

(Continued)

FOREIGN PATENT DOCUMENTS

| CN | 102713862 A | 10/2012 |
| CN | 104794136 A | 7/2015 |

(Continued)

OTHER PUBLICATIONS

English Translation of First Chinese Offie Action for corresponding CN Application No. 202010077017.2, dated Feb. 21, 2023, 14 pages.

(Continued)

*Primary Examiner* — Marc Duncan
(74) *Attorney, Agent, or Firm* — Lee & Hayes P.C.

(57) ABSTRACT

A data processing method, an apparatus, a database system, an electronic device, and a storage medium are disclosed. The data processing method includes obtaining problem analysis result data generated according to abnormality indicators of a database system, wherein the problem analysis results include associated abnormality indicators that are related in abnormality indicators and abnormality propagation relationships between the associated abnormality indicators; generating a directed alert graph used for displaying causal relationships between causes of abnormality corresponding to the associated abnormality indicators and abnormal phenomena based on the associated abnormality indicators and the abnormality propagation relationships between the associated abnormality indicators; and displaying the directed alert graph for giving an alert. Using the embodiments of the present disclosure can give an alert more intuitively and efficiently.

16 Claims, 10 Drawing Sheets

(51) Int. Cl.
*G06F 11/32* (2006.01)
*G06F 16/215* (2019.01)

(52) U.S. Cl.
CPC ........ *G06F 11/0772* (2013.01); *G06F 11/327* (2013.01); *G06F 16/215* (2019.01)

(56) References Cited

U.S. PATENT DOCUMENTS

| | | | |
|---|---|---|---|
| 2014/0146662 | A1 | 5/2014 | Okabe |
| 2014/0279718 | A1* | 9/2014 | Southey ................. G06N 5/022 706/11 |
| 2015/0033086 | A1* | 1/2015 | Sasturkar .............. G06F 11/079 714/57 |
| 2015/0281011 | A1* | 10/2015 | Gates ................... H04L 41/065 709/224 |
| 2019/0165988 | A1* | 5/2019 | Wang .................... H04L 41/064 |
| 2020/0241949 | A1* | 7/2020 | Basu ................... G06F 11/0775 |
| 2021/0200660 | A1* | 7/2021 | Ambichl ............. G06F 11/3452 |

FOREIGN PATENT DOCUMENTS

| | | |
|---|---|---|
| CN | 109034521 A | 12/2018 |
| CN | 109450677 A | 3/2019 |
| CN | 109634808 A | 4/2019 |
| CN | 109634813 A | 4/2019 |
| CN | 109933452 A | 6/2019 |
| CN | 111309567 A | 6/2020 |
| JP | 2000214924 A | 8/2000 |

OTHER PUBLICATIONS

Translation of International Search Report for corresponding PCT application No. PCT/CN2021/072596 dated Jul. 29, 2021, 2 pages.
Translation of Written Opinion for corresponding PCT Application No. PCT/CN2021/072596 dated Jul. 23, 2022, 5 pages.
English Translation of CN Second Office Action and Search Report for corresponding Chinese Application No. 202010077017.2 dated Jul. 29, 2023, 8 pages.

* cited by examiner

DATA PROCESSING METHOD, APPARATUS, DATABASE SYSTEM, ELECTRONIC DEVICE, AND STORAGE MEDIUM

CROSS REFERENCE TO RELATED PATENT APPLICATIONS

This application claims priority to and is a continuation of PCT Patent Application No. PCT/CN2021/072596 filed on 19 Jan. 2021, and is related to and claims priority to Chinese Application No. 202010077017.2, filed on 23 Jan. 2020 and entitled "Data Processing Method, Apparatus, Database System, Electronic Device, and Storage Medium," which are incorporated herein by reference in their entirety.

TECHNICAL FIELD

The present disclosure relates to the field of computer technologies, and in particular, to data processing methods, apparatuses, database systems, electronic devices, and storage media.

BACKGROUND

As a system that can store and maintain data, stable and reliable operations of a database system is the basis for providing users with good services. In order to ensure stable and reliable operations of a database system, it is necessary to monitor the database system, and find and eliminate faults in time.

In existing technologies, by monitoring more than 100 operation indicators of a database system, a determination is made as to whether an alarm or abnormal event exists in the database system. If an alarm or abnormal event exists, an abnormal operation indicator is displayed to the database administrator (DBA) by sending a message, so as to realize the purpose of the alarm.

The problem with this type of alarm interaction method is that a database administrator needs to manually determine a root cause of an abnormal operation indicator after observing the abnormal operation indicator. This requires the database administrator to first read about 20 key operation indicators, infer more fine-grained operation indicators through the data of these key operation indicators, query associated events corresponding to the operation indicators, and finally infer a root cause. Such process requires the database administrator to spend 5 minutes or more to locate the root cause of an abnormal operation indicator, which leads to a long time consumption, fails to provide users with stable and reliable database services, and relies on the database administrator's personal experience.

Therefore, there is an urgent need for an interactive method that enables database administrators to quickly and easily determine root causes of abnormal operation indicators, so as to help the database administrators to maintain database systems.

SUMMARY

This Summary is provided to introduce a selection of concepts in a simplified form that are further described below in the Detailed Description. This Summary is not intended to identify all key features or essential features of the claimed subject matter, nor is it intended to be used alone as an aid in determining the scope of the claimed subject matter. The term "techniques," for instance, may refer to device(s), system(s), method(s) and/or processor-readable/computer readable instructions as permitted by the context above and throughout the present disclosure.

Embodiments of the present disclosure provide a data processing solution to solve some or all of the above problems.

According to the embodiments of the present disclosure, a data processing method is provided, which includes: obtaining problem analysis result data generated according to abnormality indicators of a database system, wherein the problem analysis results include associated abnormality indicators that are related in abnormality indicators and abnormality propagation relationships between the associated abnormality indicators; generating a directed alert graph used for displaying causal relationships between causes of abnormality corresponding to the associated abnormality indicators and abnormal phenomena based on the associated abnormality indicators and the abnormality propagation relationships between the associated abnormality indicators; and displaying the directed alert graph for giving an alert.

According to the embodiments of the present disclosure, a data processing apparatus is provided, which includes: an acquisition module configured to obtain problem analysis result data generated according to abnormality indicators of a database system, wherein the problem analysis results include associated abnormality indicators that are related in abnormality indicators and abnormality propagation relationships between the associated abnormality indicators; a generating module configured to generate a directed alert graph used for displaying causal relationships between causes of abnormality corresponding to the associated abnormality indicators and abnormal phenomena based on the associated abnormality indicators and the abnormality propagation relationships between the associated abnormality indicators; and a display module configured to display the directed alert graph for giving an alert.

According to the embodiments of the present disclosure, an electronic device is provided, which includes: a processor, a memory, a communication interface, and a communication bus. The processor, the memory, and the communication interface communicate with each other through the communication bus. The memory is used for storing at least one executable instruction, and the executable instruction causes the processor to perform operations corresponding to the data processing method described in the first aspect.

According to the embodiments of the present disclosure, a computer storage medium is provided, on which a computer program is stored. When the program is executed by a processor, the data processing method according to the first aspect is implemented.

According to the embodiments of the present disclosure, a database system is provided, which includes: a processing component configured to obtain data of a problem analysis result generated according to abnormality indicators of the database system, wherein the problem analysis result includes the abnormality indicators that are related in abnormality indicators and abnormality propagation relationships between the associated abnormality indicators; and an interactive display interface configured to display a directed alert graph, the alert graph being generated based on the associated abnormality indicators and the abnormality propagation relationships between the associated abnormality indicators.

According to the data processing solution provided by the embodiments of the present disclosure, problem analysis result data is generated according to abnormality indicators, and then a directed alert graph that can indicate causal relationships between causes of abnormality and abnormal phenomena is generated according to the problem analysis result data. Using this type of directed graph method to interact with a user enables the user to intuitively determine the cause of abnormality, and conveniently and concisely view various abnormal phenomena caused by such cause of abnormality, so that the abnormality can be quickly eliminated. Giving an alert through this type of directed alert graph makes interactions with a user more intuitive, fast, and concise, thus improving the efficiency of interaction.

BRIEF DESCRIPTION OF THE DRAWINGS

In order to illustrate or the technical solutions of the embodiments of the present disclosure more clearly, accompanying drawings that are used in the description of the embodiments will be briefly described below. Apparently, the drawings in the following description represent only some example implementations described in the embodiments of the present disclosure. One of ordinary skill in the art can also obtain other drawings according to these drawings.

DETAILED DESCRIPTION

In order to make one skilled in the art to better understand the technical solutions in the embodiments of the present disclosure, the technical solutions in the embodiments of the present disclosure will be clearly and completely described below with reference to the accompanying drawings in the embodiments of the present disclosure. The described embodiments represent only some but not all of the embodiments of the present disclosure. All other embodiments obtained by one of ordinary skill in the art based on example implementations in the embodiments of the present disclosure shall fall within the scope of protection of the embodiments of the present disclosure.

The specific implementation of the embodiments of the present disclosure is further described below with reference to the accompanying drawings of the embodiments of the present disclosure.

Figure 1A:
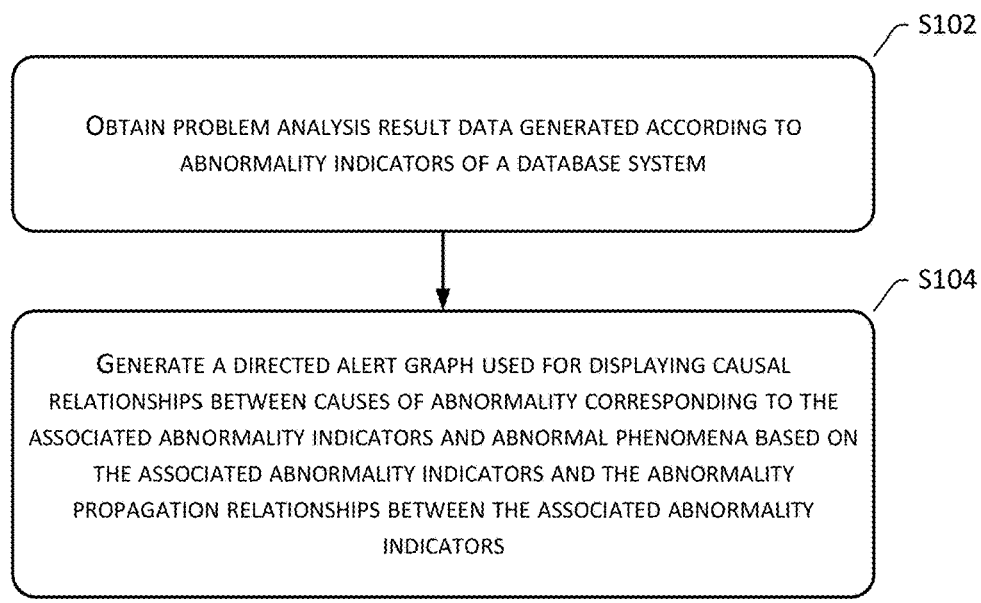
FIG. 1a is a flowchart of a data processing method according to the embodiments of the present disclosure.

Referring to FIG. 1a, a flowchart of a data processing method 100 according to the embodiments of the present disclosure is shown.

In implementations, the data processing method 100 can be applied in a server end configured with a database system (the server end includes a server or a cloud), and giving an alert for a failure of the database system is used as an example for description. Apparently, in other embodiments, the data processing method 100 may be applied in a terminal device.

In implementations, the data processing method 100 includes the following steps:

Step S102: Obtain problem analysis result data generated according to abnormality indicators of a database system.

An abnormality indicator of the database system may be an abnormal part of a monitored operation indicator, and the operation indicator is used to indicate an operational status of the database system. For example, operation indicators include, but are not limited to, CPU usage, memory usage, service traffic, tcp response times, etc. If a value of one or some operation indicators that are monitored exceeds a reasonable range, it is determined to be an abnormality indicator.

Problem analysis result data can be obtained by analyzing and processing abnormality indicators. The problem analysis result data includes associated abnormality indicators that have an association relationship among abnormality indicators, and abnormality propagation relationships between these associated abnormality indicators.

Associated abnormality indicators refer to a plurality of different abnormality indicators caused by the same cause in the database system, and these abnormality indicators are related. For example, in a certain failure situation, associated abnormality indicators include: host CPU usage reaching 100%, an increase in host CPU usage, an increase in disk IO per second, an increase in disk IO response time, an increase in the number of active database sessions, and an increase in tcp response time, a decrease in service traffic, etc. These correlated abnormality indicators may be caused by the same cause.

For example, an abnormality propagation relationship between the associated abnormality indicators is: the host CPU usage reaches 100%, which leads to the increase in the host CPU usage, the increase in the disk IO per second, and the increase in the disk IO response time, which in turn leads to an increase in the number of active database sessions and an increase in the tcp response time, and eventually leads to a decrease in service traffic.

One skilled in the art can analyze abnormal data in any appropriate manner to obtain problem analysis result data. For example, DAS (Database autonomy Service) is used to analyze abnormality indicators, so as to obtain failure analysis result data outputted thereby.

For another example, after abnormality indicators are obtained, the abnormality indicators are classified through a clustering algorithm and an association analysis, to obtain a classification result. Associated abnormality indicators that are related in the classification result belong to a same class, and each class may include one or more layers. A fluctuation direction indicated by associated abnormality indicators in the same layer is most likely to be consistent. For example, an increase in host CPU usage, an increase in disk IO per second and an increase in disk IO response time are located at the same layer in the classification result, and their indicated fluctuation direction is an increase.

For each layer of associated abnormality indicators in the classification result, an abnormality propagation direction among the associated abnormality indicators can be determined by a propagation direction analysis algorithm, so as to determine abnormality propagation relationships, and then generate problem analysis result data.

In implementations, in a feasible manner, generalized classification is performed by means of generalization processing for associated abnormality indicators of each layer in the classification result, and then problem analysis result data is generated according to a generalization result of the generalized classification. In this way, by generalizing and classifying the associated abnormality indicators, it solves the problems of the difficulty of reflecting abnormalities of a database system through a large number of associated abnormality indicators, and the failure of providing users a clear interaction due to too many associated abnormality indicators being displayed at the same layer. This type of generalized classification method makes a directed alert graph that is subsequently generated to be more interpretable, and effectively summarizes a large number of associated abnormality indicators.

Apparently, in other embodiments, one skilled in the art may generate problem analysis result data in other manners, which are not limited in implementations.

Step S104: Generate a directed alert graph used for displaying causal relationships between causes of abnormality corresponding to the associated abnormality indicators and abnormal phenomena based on the associated abnormality indicators and the abnormality propagation relationships between the associated abnormality indicators.

In implementations, in order to facilitate the generation of a directed alert graph, candidate causes of abnormality and candidate abnormal phenomena can be preset, and the candidate causes of abnormality and the candidate abnormal phenomena can be classified. As such, when a directed alert graph is subsequently generated, the directed alert graph can be displayed according to classification, making the directed alert graph to be more concise and intuitive.

A specific classification method may be: candidate causes of abnormality are mainly divided into three categories, namely instance abnormal workload, host problems, and external operation problems.

The abnormal instance workload can be divided into a number of sub-categories. For example, the abnormal instance workload includes at least one of the following: CPU intensive workload, IO intensive workload, and faulty structured query statement (Poor SQL).

Host problems can be divided into a number of sub-categories. For example, host problems include at least one of the following: host CPU bottleneck, host IO bottleneck, host memory bottleneck, host network bottleneck, host storage bottleneck, and host hardware problem (Host Hardware Problem).

External operation problems can be divided into a number of sub-categories. For example, external operation problems include at least one of the following: instance parameter adjustment problem, instance master/slaveswitch operations problem, instance migration/backuptasks problem, and host operation tasks problem.

The candidate abnormal phenomena can be divided into abnormal phenomena of different layers according to different objects of the database system that are involved. Specific examples are a resource phenomenon, a session phenomenon, a TCP response time phenomenon (TCP RT phenomenon), an overload phenomenon (outage phenomenon), etc. For example, the candidate abnormal phenomena includes at least one of the following: sudden increase in instance CPU (instance CPU saturation), sudden increase in instance IO (instance IO saturation), instance memory overflow (instance OOM), host CPU resource preemption (host preemption of CPU), host IO resource preemption (host preemption of IO), host memory resource preemption (host preemption of memory), host network resource preemption (host preemption of network), abnormal change in host space (local/remote storage change session), sudden increase of number of sessions, sudden increase in TCP response time (TCP RT sudden increase), and decrease in service traffic (traffic drop).

It should be noted that one skilled in the art may adopt different classification methods according to different needs, which are not limited in implementations.

In implementations, when a cause of abnormality and an abnormal phenomenon are determined according to the problem analysis result data, a root abnormality indicator and remaining abnormality indicator(s) can be determined according to the abnormality propagation relationships between the associated abnormality indicators. For example, if the root abnormality indicator is that the host CPU usage reaches 100%, according to a correspondence relationship, the cause of abnormality corresponding to this root abnormality indicator is determined to be a host CPU bottleneck. Similarly, a corresponding abnormal phenomenon can be determined for each remaining abnormality indicator.

Since the abnormal phenomena corresponding to different remaining abnormality indicators may be different, propagation relationships between different abnormal phenomena can be further determined according to the abnormality propagation relationships, and then a directed alert graph can be generated according to the cause(s) of abnormality, the abnormal phenomena and the propagation relationships between the abnormal phenomena.

Specifically, candidate causes of abnormality are classified and displayed in the directed alert graph, and a determined cause of abnormality is set to be in a style different from other causes of abnormality, so that a user can intuitively see the causes of abnormality. In addition, candidate abnormal phenomena at each layer are arranged sequentially according to the propagation relationships between the abnormal phenomena, and a determined abnormal phenomenon is set in a style different from other abnormal phenomena, so that the user can intuitively determine the abnormal phenomenon caused by the cause of abnormality.

In implementations, a directed alert graph is used to abstract a specific database system (different layers, such as from a request layer to a database engine layer, and then to a host layer where a database instance is located, etc.) into nodes in the graph to abstract an abnormality propagation relationship as a directed edge connecting two nodes, thereby abstracting the database system, so as to more conveniently and clearly show a causal relationship of an abnormality that occurs.

Subsequently, the directed alert graph may be displayed to the user for alerting.

For example, in order to facilitate a user (such as a database administrator) to understand the abnormality in time, and to intuitively determine the cause of abnormality and the abnormal phenomenon caused by the abnormality, after generating the directed alert graph, the directed alert graph can be displayed, so as to interact with the user through this type of relatively direct interactive mode, thereby giving an alert.

Figure 1B:
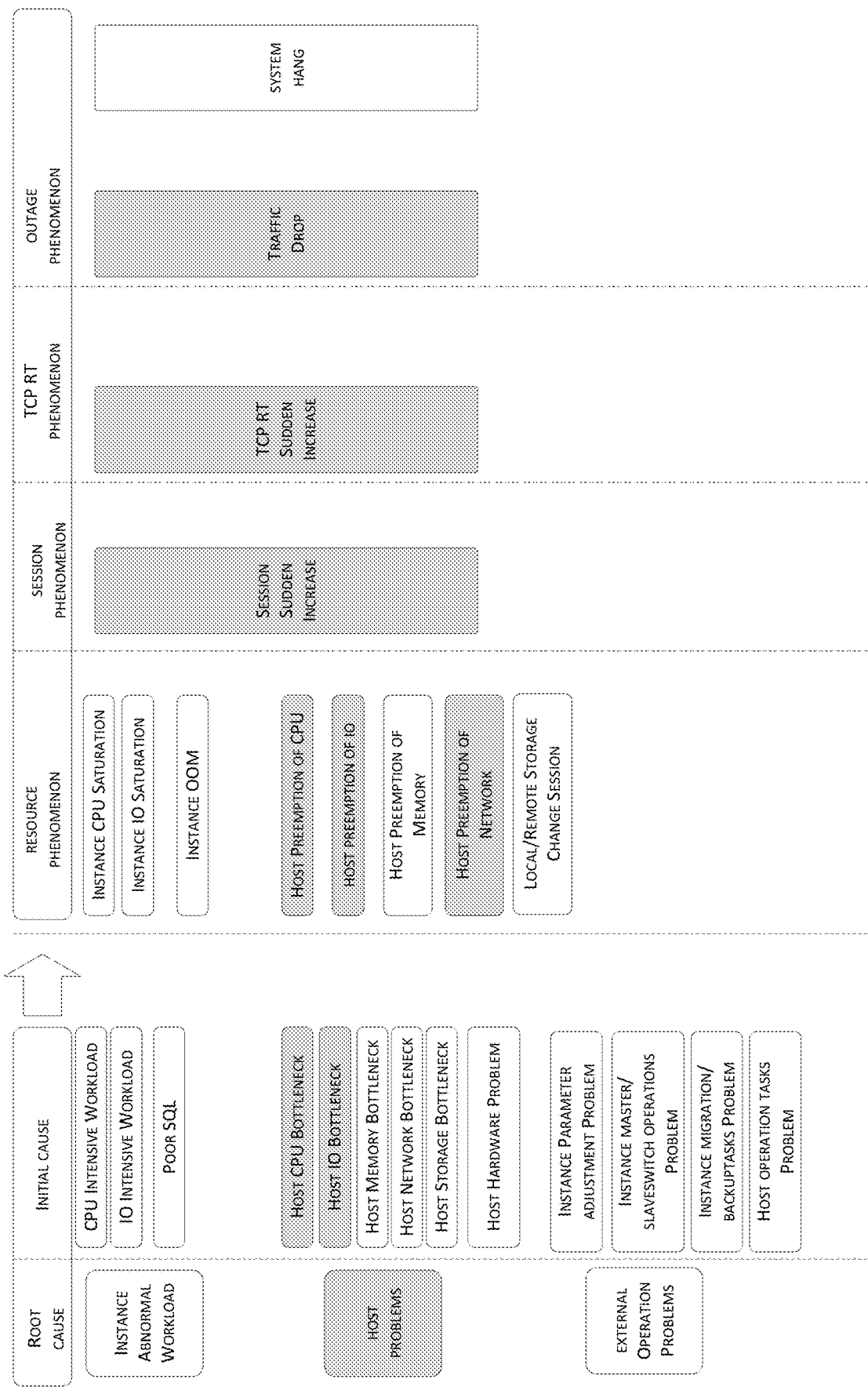
FIG. 1B is a schematic diagram of a directed alert graph generated according to the embodiments of the present disclosure.

A directed alert graph is shown in FIG. 1B. The directed alert graph visually displays an alert graph of instance problems and service traffic drop caused by host resource bottlenecks. Host resource bottlenecks (i.e., host CPU bottleneck and host IO bottleneck as shown in the figure) are causes of abnormality, and host CPU resource preemption, host IO resource preemption, and host network resource preemption are all abnormal phenomena. Using this type of directed alert graph, users can quickly locate the causes of abnormality, so that the abnormality can be quickly resolved.

Using the present disclosure, problem analysis result data is generated according to abnormality indicators, and a directed alert graph that can indicate causal relationships between causes of abnormality and abnormal phenomena is then generated according to the problem analysis result data. Using this type of directed graph to interact with a user enables the user to intuitively determine the cause(s) of abnormality, and conveniently and concisely view each abnormal phenomenon caused by the cause(s) of abnormality, so that the abnormality can be quickly eliminated. Giving an alert through this type of directed alert graph makes interactions with the user more intuitive, fast, and concise, and improves the efficiency of interaction.

The data processing method in implementations may be executed by any appropriate electronic device with data processing capabilities, including but not limited to: a server, a mobile terminal (such as a tablet computer, a mobile phone, etc.), a PC, and the like.

Figure 2A:
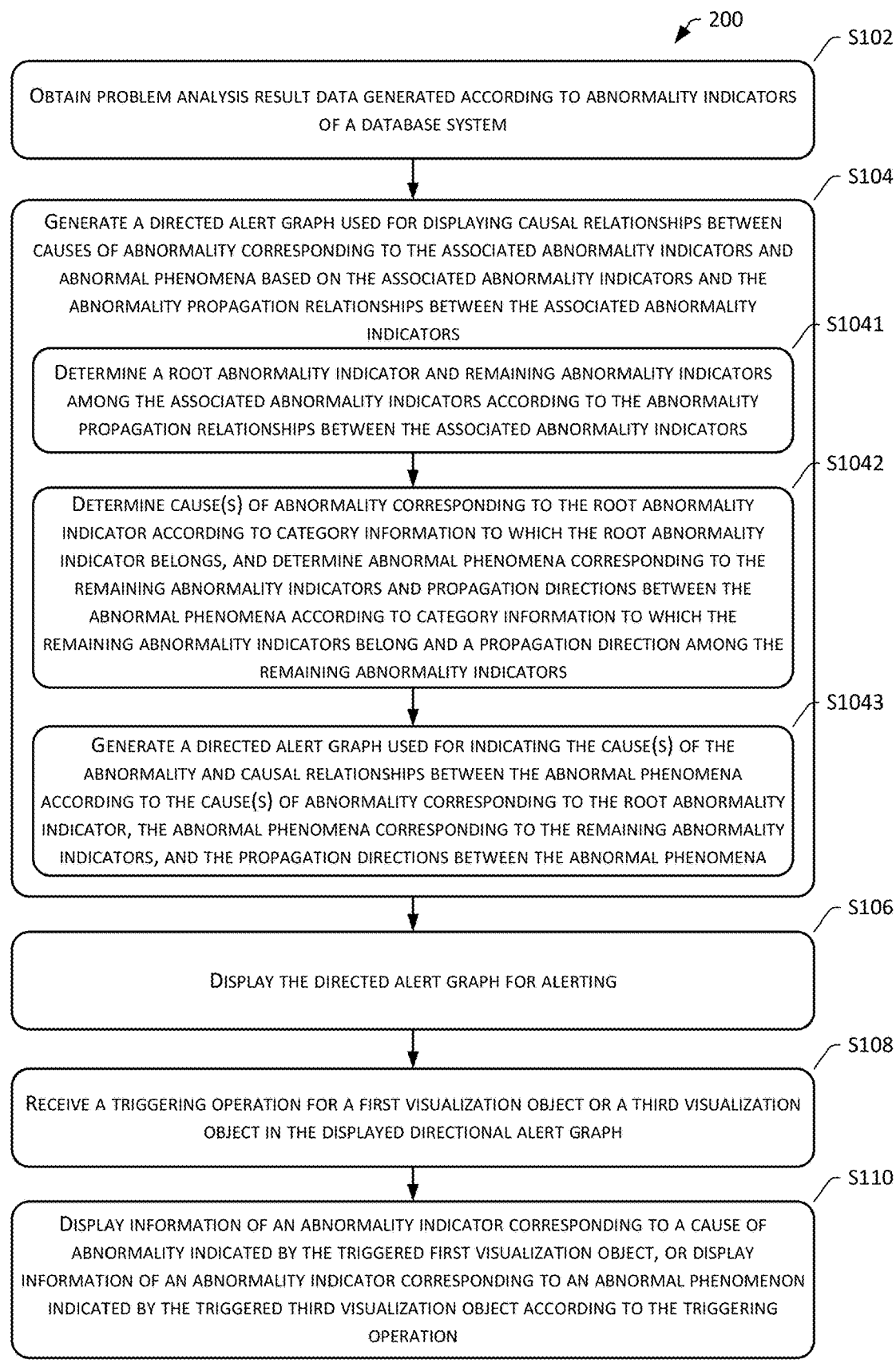
FIG. 2a is a flowchart of the steps of a data processing method according to the embodiments of the present disclosure.

Referring to FIG. 2a, a flowchart of a data processing method 200 according to the embodiments of the present disclosure is shown.

In implementations, the data processing method 200 can be applied to a server end configured with a database system (the server end includes a server or a cloud), and giving an alert for a failure of the database system is used as an example for description. Apparently, in other embodiments, the data processing method 200 may be applied to a terminal device.

In implementations, the data processing method 200 includes the steps S102 to S104 as described above.

Figure 2B:
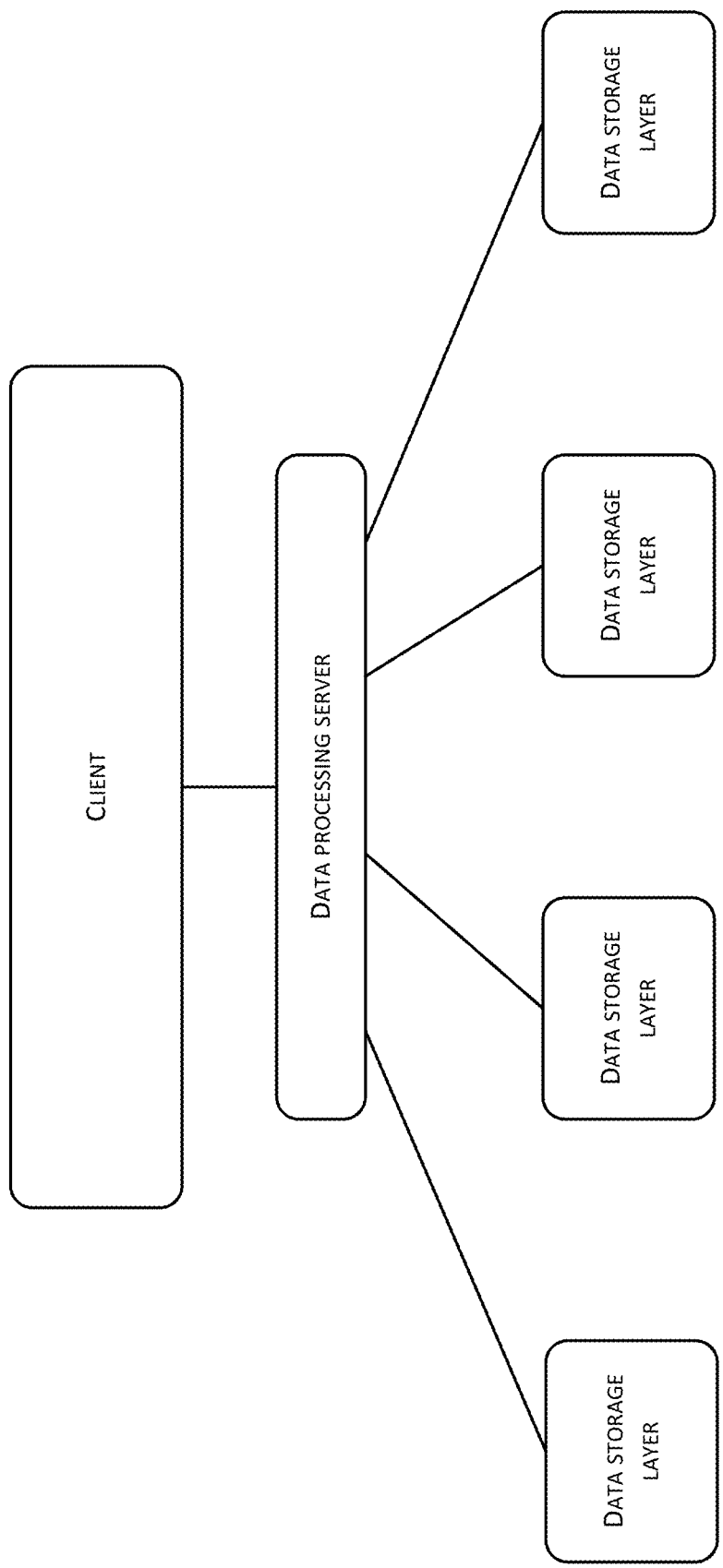
FIG. 2b is a schematic structural diagram of a database system according to the embodiments of the present disclosure.

In conjunction with a database system shown in FIG. 2b, an implementation of generating a directed alert graph and conducting interactions through the directed alert graph will be described by way of a specific example. In database systems, clients are used to interact with users, such as receiving user requests. A data processing server is used to process user requests and interact with a data storage layer to obtain data.

In step S102, an abnormality indicator may be an indicator encountering abnormality among operation indicators that are monitored.

Figure 2C:
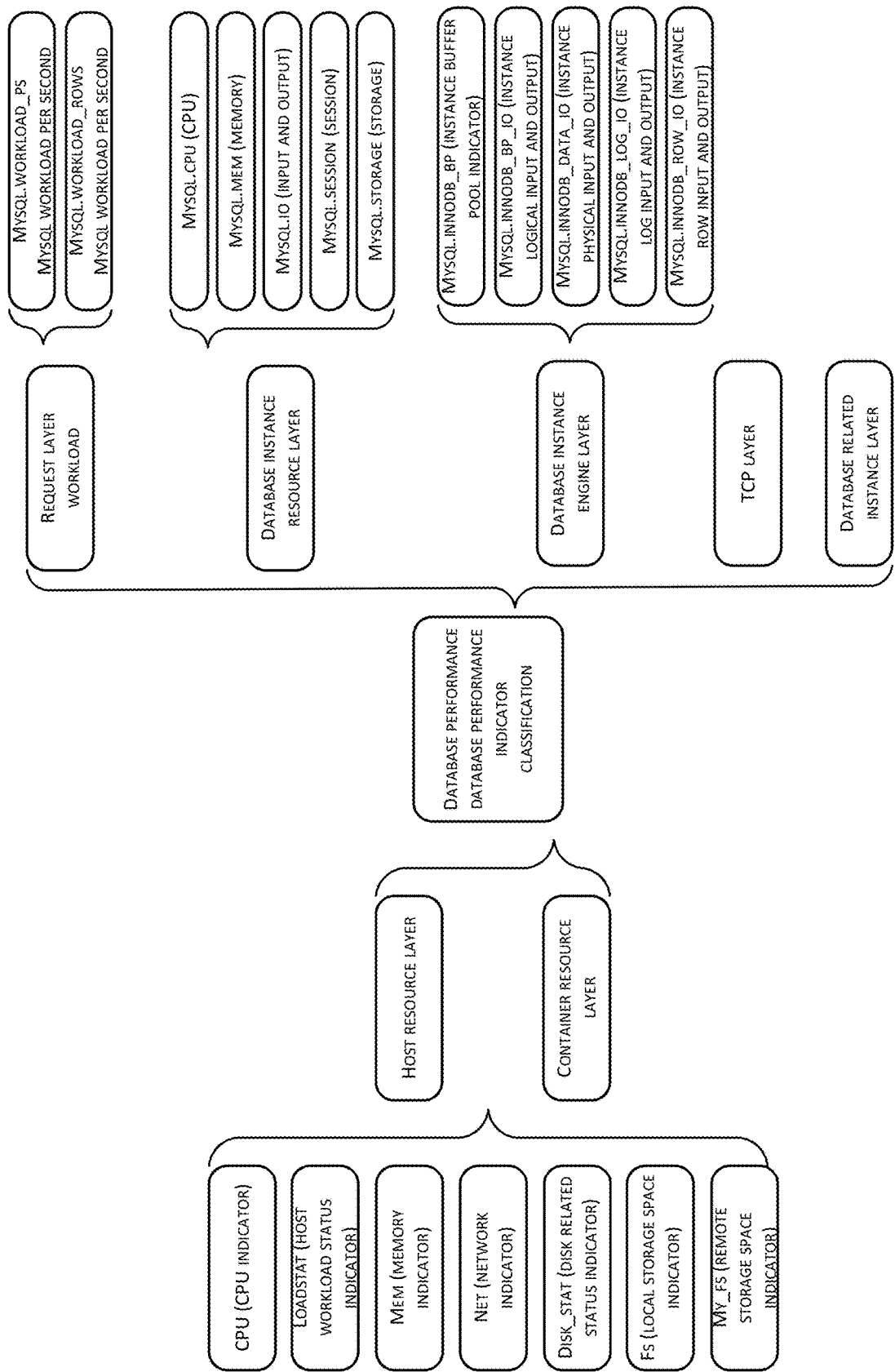
FIG. 2c is a schematic diagram of classifications of database performance indicators according to the embodiments of the present disclosure.

As shown in FIG. 2c, in implementations, operation indicators mainly refer to operation indicators of a data processing server and a data storage layer that are under detection. According to different monitored objects, operation indicators can be divided into the following categories:

Operation indicators, which belong to a host resource layer (host_resource) and a container resource layer, are used to monitor problems of a host (such as a cloud elastic server ECS or a physical machine, etc.) or a container where a database system is located. The operation indicators in the host resource layer and the container resource layer include, but are not limited to: CPU (central processing unit) usage, IO (Input/Output) usage, memory usage, and storage space occupation.

Operation indicators, which belong to a database instance resource layer (mysql_resource), are used to monitor resource class indicators of an instance layer where the database system is located, so as to realize the purpose of monitoring problems of the instance layer. The operation indicators in the database instance resource layer include, but are not limited to: mysql.cpu, mysql.storage, mysql.io, mysql.mem, and mysql.session.

Operation indicators, which belong to a TCP layer, include indicators used for monitoring things that are related to response time to reflect response times of a network layer to requests. The operation indicators in the TCP layer include, but are not limited to: tcp_rt (i.e., tcp_response time, tcp response time).

Operation indicators, which belong to workload of a request layer, include indicators that monitor SQL executed by users and workload of SQL, and other indicators applied to request operation classes of database instances, so as to monitor workload of the request layer. The running indicators in the request layer load include, but are not limited to: mysql.workload_rows, and mysql.workload_ps.

Other categories of operation indicators can also include operation indicators that belong to a database instance engine layer (such as mysql_innodb_bp, mysql_innodb_b-p_io, mysql_innodb_data_io, and mysql_innodb_log_io, etc.) and operation indicators that belong to a database-related instance layer (such as mysql.cluster, and mysql.slave, etc.).

It should be noted that different classification criteria may be used to classify operation indicators according to different needs, which are not limited in implementations. In the following, host CPU usage reaching 100% (cpu.usage reach 100%), increase in host CPU usage (cpu.usage↑), increase in disk IO per second (diskstat.iops↑), increase in the number of active database sessions (mysql.active_session↑), increase in tcp response time (tcp_rt↑), and decrease in service traffic (mysql.insert_ps↓) are used as examples of abnormality indicators, and the data processing method is described as follows:

By analyzing and processing abnormality indicators, problem analysis result data is obtained, and the problem analysis result data includes associated abnormality indicators and abnormality propagation relationships between the associated abnormality indicators.

For example, using the method described in the first embodiment as described above, clustering algorithm, association analysis algorithm and generalized classification algorithm are used to process abnormality indicators, and a generalized classification result is obtained as problem analysis result data.

Abnormality indicators include the following information: indicator's attributes (Attribute), indicator value's domain (Domain), generalization hierarchy (Generalization Hierarchy) and dissimilarity (Dissimilarity).

An indicator's attribute is used to indicate information constituting the indicator's feature. An indicator's value domain is used to indicate a value range of the indicator, and a threshold can be set for the indicator's value domain. If the indicator's value is below the threshold, the indicator will not be regarded as an abnormality indicator no matter how it fluctuates. A generalization hierarchy is used to indicate a generalization hierarchy of a corresponding abnormality indicator, that is, category information to which the abnormality indicator belongs (for example, CPU usage reaching 100% belongs to CPU usage in a host resource layer, etc.). Dissimilarity indicates an association relationship between different indicators. Abnormality indicators with a low degree of similarity are not related, and will not be classified into one category by generalized classification.

After the problem analysis result data is obtained, step S104 may be executed to generate a directed alert graph based on the problem analysis result data.

In implementations, step S104 includes the following sub-steps:

Sub-step S1041: Determine a root abnormality indicator and remaining abnormality indicators among the associated abnormality indicators according to the abnormality propagation relationships between the associated abnormality indicators.

For a certain associated abnormality indicator, if a propagation direction between associated abnormality indicators determined according to an abnormality propagation relationship does not point to the associated abnormality indicator, such associated abnormality indicator is determined to be a root abnormality indicator. It needs to be noted that the number of root abnormality indicator may be one or more than one. For example, as described above, CPU usage reaches 100%, and it is the root abnormality indicator.

Among all the associated abnormality indicators, other abnormality indicators except the root abnormality indicator are remaining abnormality indicators. For example, as described above, increase in host CPU usage, increase in disk IO per second, increase in the number of active database sessions, increase in tcp response time, and decrease in service traffic are remaining abnormality indicators.

Sub-step S1042: Determine cause(s) of abnormality corresponding to the root abnormality indicator according to category information to which the root abnormality indicator belongs, and determine abnormal phenomena corresponding to the remaining abnormality indicators and propagation directions between the abnormal phenomena according to category information to which the remaining abnormality indicators belong and a propagation direction among the remaining abnormality indicators.

After determining the root abnormality indicator and the remaining abnormality indicators, according to the category information of the root abnormality indicator in the problem analysis result data, for example, the category to which the CPU usage reaches 100% is the CPU usage in the host resource layer, a corresponding cause of abnormality can be determined according to the category information. For example, the cause of abnormality corresponding to "CPU usage in host resource layer reaches 100%" is "host CPU bottleneck in host problem".

Similarly, a corresponding abnormal phenomenon can be determined according to category information to which each remaining abnormality indicator belongs. For example, an abnormal phenomenon corresponding to a remaining abnormality indicator "increase in host CPU usage" is "host CPU resource preemption", etc.

In addition, propagation directions among the remaining exception indicators can be determined according to abnormality propagation relationships. For example, a propagation direction between a remaining exception indicator A "increase in disk IO per second" and a remaining exception indicator B "increase in tcp response time" is from A to B.

Sub-step S1043: Generate a directed alert graph used for indicating the cause(s) of the abnormality and causal relationships between the abnormal phenomena according to the cause(s) of abnormality corresponding to the root abnormality indicator, the abnormal phenomena corresponding to the remaining abnormality indicators, and the propagation directions between the abnormal phenomena.

In implementations, a directed alert graph includes a first visualization object corresponding to a cause of abnormality, and a second visualization object corresponding to remaining causes other than the cause of abnormality in preset candidate causes. The first visualization object is distinguished from the second visualization object. For example, processing such as highlighting, coloring, etc. is performed on the first visualization object to make it different from the second visualization object.

Additionally or alternatively, the directed alert graph further includes a third visualization object corresponding to an abnormal phenomenon, and a fourth visualization object corresponding to remaining phenomena other than the abnormal phenomenon in preset candidate phenomena. The third visualization object is distinguished from the fourth visualization object. For example, the third visualization object is highlighted, colored, etc., to be distinguished from the fourth visualization object.

Figure 2D:
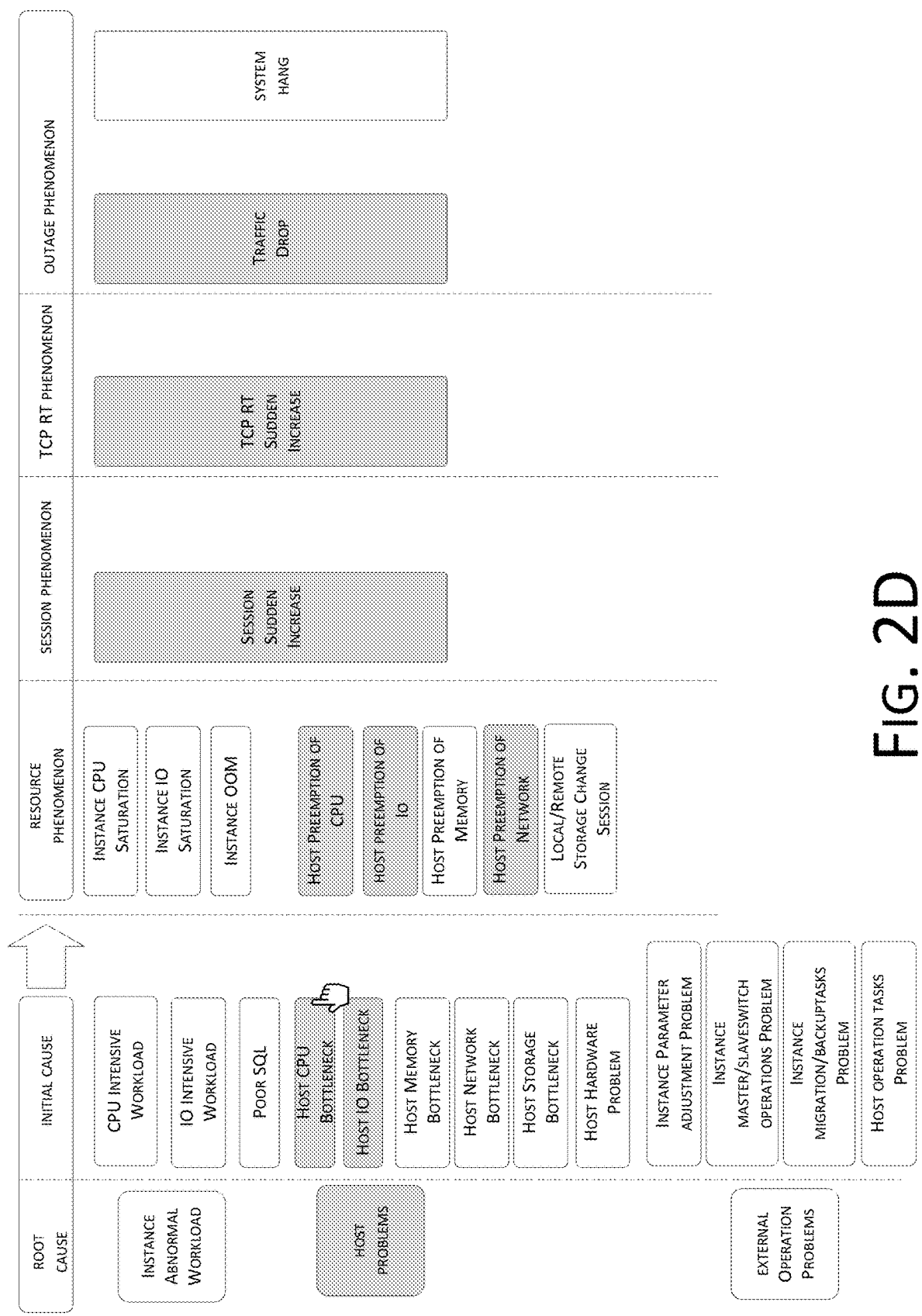
FIG. 2d is a schematic diagram of generating a directed alert graph in a usage scenario according to the embodiments of the present disclosure.

Icons such as arrows can indicate a propagation direction between a cause of abnormality and an abnormal phenomenon, and a propagation direction between two abnormal phenomena, so as to facilitate a user to determine a causal relationship. Alternatively, abnormal phenomena may be arranged sequentially along a certain direction to indicate a propagation direction, as long as the user can determine the causal relationship according to the directed alert graph. A directed alert graph that is generated is shown in FIG. 2d.

In implementations, in order to further improve interactivity and make it more convenient for users to view abnormality indicators, the method further includes:

Step S106: Display the directed alert graph for alerting.

For example, the directed alert graph is displayed in a display interface so that the user can view it intuitively.

Step S108: Receive a triggering operation for a first visualization object or a third visualization object in the displayed directional alert graph.

When viewing the directed alert graph, if the user wants to view a root abnormality indicator corresponding to a certain type of abnormality or remaining abnormality causes corresponding to a certain type of abnormality, the user can performs a triggering operation (such as a click) on the first visualization object or the third visualization object in the directed alert graph.

For example, the user clicks on the first visualization object labeled with "Host CPU Bottleneck" in FIG. 2d, or clicks the third visualization object labeled with "Host CPU Resource Preemption" in FIG. 2d.

Step S110: Display information of an abnormality indicator corresponding to a cause of abnormality indicated by the triggered first visualization object, or display information of an abnormality indicator corresponding to an abnormal phenomenon indicated by the triggered third visualization object according to the triggering operation.

The information of the abnormality indicator includes at least one of the following: identification of the abnormality indicator and identification of fluctuation used to represent a direction of abnormal fluctuation of the abnormality indicator. Identification of abnormality indicator includes, for example, cpu.usage, etc., and identification of fluctuation representing a direction of abnormal fluctuation of abnormality indicator includes, for example, reach 100% or up, down, etc.

For example, after the user clicks on the first visualization object labeled with "host CPU bottleneck" in FIG. 2d, the cause of abnormality corresponding to the first visualization object is host CPU bottleneck. The information of the corresponding abnormality indicator is determined according to the cause of abnormality to be "cpu.usage reach 100%", and the information of this abnormality indicator is displayed in the directed alert graph. Apparently, in other embodiments, different display methods can be used when displaying information of abnormality indicators. For example, after the user clicks on the first visualization object labeled with "host CPU bottleneck" in FIG. 2d, the cause of abnormality corresponding to the first visualization object is host CPU bottleneck, and a category to which the cause of abnormality belongs (such as host problem) is determined. Information of all abnormality indicators corresponding to the category, such as "cpu.usage reach 100%" and "diskstat.util reach 100%", is determined. The information of all these abnormality indicators is displayed in the directed alert graph.

It needs to be noted that the directed alert graph in implementations may be any abnormality propagation knowledge graph or a Petri net graph, etc., as long as that can intuitively display causes of abnormality, causal relationships between abnormal phenomena, and propagation relationships between the abnormal phenomena.

Through this type of directed alert graph, abnormality of a database system can be visually displayed, so that a user can quickly locate the root cause of abnormality, and then quickly eliminate the abnormality. This solves the problem in the existing technologies that using pie charts to display calling problems or displaying problems of modules in each database system through diagnosis items can only display abnormal phenomena. Overcoming the fundamental cause of abnormality associated with an abnormality often leads to multiple abnormal phenomena, which in turn lead to a series of sub-phenomena. Simply displaying the abnormal phenomena is not conducive to the user's handling of the abnormality.

Interacting with the user through this type of directed alert graph can allow the user to intuitively feel propagation relationships of abnormalities, better understand the working principles of the database system, and allow non-professional users such as database administrators to understand abnormality propagation relationships of the database system, which makes it easier to eliminate abnormalities to increase user stickiness, and can accumulate directed alert graphs of abnormalities that have occurred to be used by subsequent big data analysis and problem analysis.

A process of implementation of generating and displaying a directed alert graph is described below in combination with a specific usage scenario as follows:

Process A: After abnormality indicators in operation indicators are obtained, the abnormality indicators are analyzed and processed to obtain problem analysis result data.

The problem analysis result data includes associated abnormality indicators and abnormality propagation relationships between the associated abnormality indicators.

Process B: According to the abnormality propagation relationships, root abnormality indicators, such as "cpu.usage reach 100%" and "diskstat.util reach 100%", in the associated abnormality indicators are determined. Associated abnormality indicators other than the root abnormality indicators are remaining abnormality indicators, for example, "cpu.usage↑", "diskstat.iops↑", and "tcp_rtt↑".

Process B1: Corresponding causes of abnormality according to respective category information to which the root abnormality indicators belong are determined.

For example, "cpu.usage reach 100%" and "diskstat.util reach 100%" both belong to the host resource layer, so a main category of the corresponding causes of abnormality is host problem. A sub-category of cause of abnormality corresponding to "cpu.usage reach 100%" is host CPU bottleneck, and a sub-category of cause of abnormality corresponding to "diskstat.util reach 100%" is host IO bottleneck.

Process B2: Corresponding abnormal phenomena are determined according to respective category information to which the remaining abnormality indicators belong.

For example, "cpu.usage↑" and "diskstat.iops↑" belong to the host resource layer, and an abnormal phenomenon corresponding to "cpu.usage↑" is host CPU resource preemption. An abnormal phenomenon corresponding to "diskstat.iops↑" is host IO resource preemption.

"tcp_rtt↑" belongs to the tcp layer, and a corresponding abnormal phenomenon is increase in TCP response time.

Process B3: According to the abnormality propagation relationships, propagation directions among the abnormal phenomena can be determined.

For example, a propagation direction of an abnormal phenomenon is the propagation from a resource phenomenon to a TCP response time phenomenon.

Process B4: A directed alert graph is generated according to the causes of abnormality, the abnormal phenomena, and the propagation directions among the abnormal phenomena.

In the directed alert graph, candidate causes of abnormality in each sub-category are displayed in groups according to categories to which the candidate causes of abnormality belong. A first visualization object is generated for the cause of abnormality, and second visualization objects are generated for remaining causes other than the cause of abnormality.

Candidate abnormal phenomena are displayed in groups according to the propagation directions among the abnormal phenomena. A third visualization object is generated for an abnormal phenomenon, fourth visualization objects are generated for remaining phenomena other than the abnormal phenomenon, and a causal relationship between a cause of abnormality and an abnormal phenomenon and/or a propagation direction between abnormal phenomena are indicated by directional signs such as arrows. A directed alert graph that is generated is shown in FIG. 2d.

FIG. 2d shows a directed alert graph of a decrease in service traffic of instances due to an instance problem caused by a host resource bottleneck. The leftmost root cause such as host problem, and an initial root cause (initial cause) corresponds to, for example, a host CPU bottleneck and a host IO bottleneck. The right part shows abnormal phenomena displayed in a sequential order according to propagation directions, such as resource phenomenon, session phenomenon, TCP response time phenomenon, etc.

Process C: A user's triggering operation on the first visualization object or the third visualization object in the displayed directional alert graph is received, and information related to abnormality indicators is displayed according to the triggering operation.

For example, the user clicks on the first visualization object corresponding to "host CPU bottleneck" in FIG. 2d. According to the clicked first visualization object, associated abnormality indicators corresponding to the category of "host CPU bottleneck" (i.e., the host problem), such as "cpu.usage reach 100%" and "diskstat.util reach 100%", etc., are displayed.

Figure 2E:
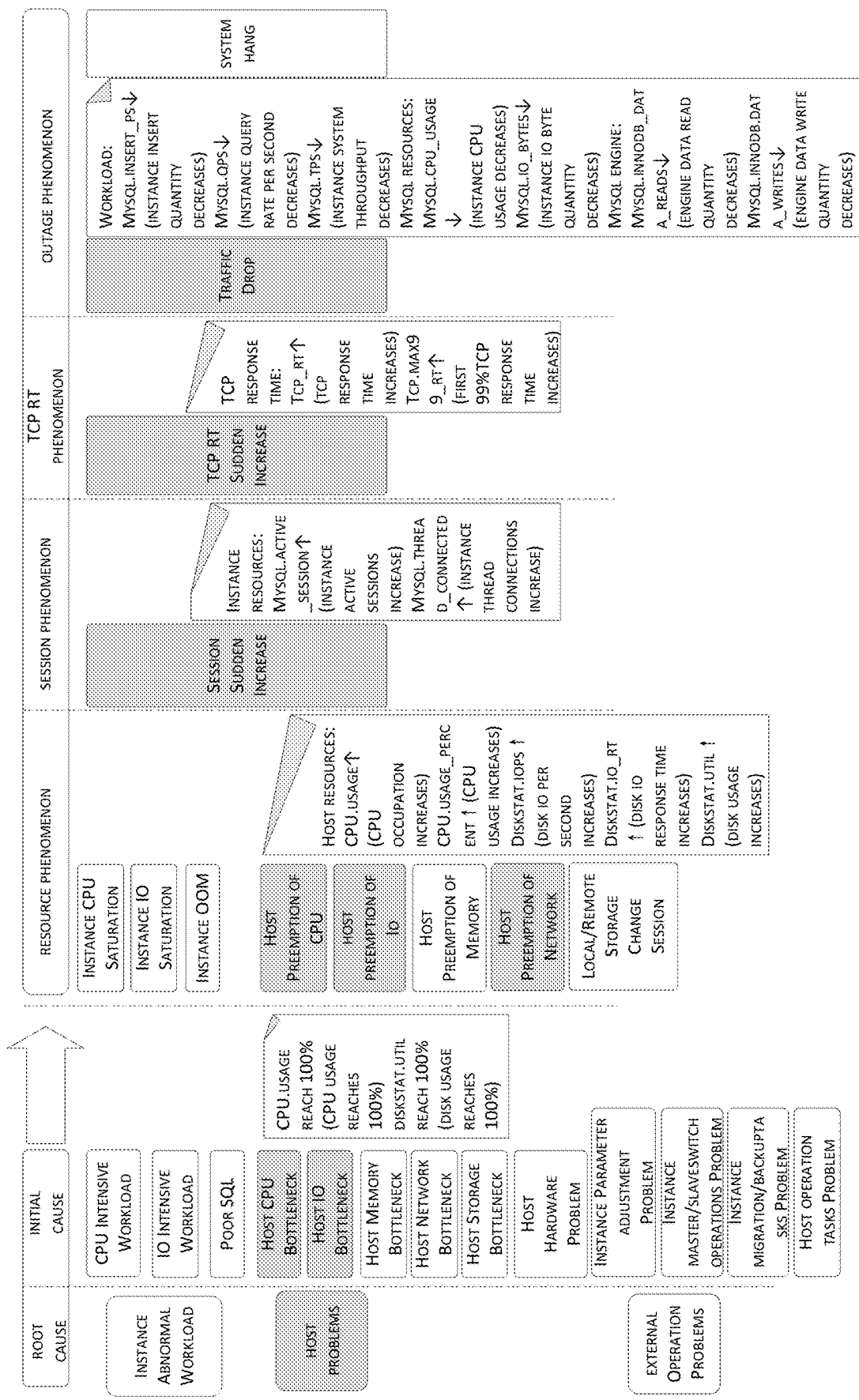
FIG. 2e is a schematic diagram of clicking a directed alert graph to display an associated abnormality indicator in the usage scenario according to the embodiments of the present disclosure.

FIG. 2e shows a schematic diagram of an interface for displaying associated abnormality indicators after the first visualization object and the third visualization object are triggered.

Using a directed alert graph having layers and directions can interact with users intuitively, display abnormality propagation information and problem propagation information of a database system, and clearly display problem analysis result data of the root cause analysis of abnormality indicators of the database system. This can understand abnormality propagation relationships between different nodes of the database system, and can mine abnormality propagation rules based on knowledge graph and multi-indicator abnormality detection, and locate root causes of abnormality through the propagation rules to conveniently and quickly eliminate abnormalities and problems.

The user can find a root cause of abnormality from the leftmost part of the directed alert graph. Through the root cause, multiple initial root causes and abnormal phenomena that are generated can be found. A list of corresponding abnormality indicators can be popped up by clicking and triggering a first visualization object corresponding to each cause of abnormality and a third visualization object corresponding to an abnormal phenomenon.

In this way, causes of abnormality and abnormal phenomena can be clearly distinguished, and different types of abnormalities can be clearly distinguished. This solves the failure of reflecting causal relationships between abnormalities by displaying abnormality indicators in a list form in the existing technologies.

In addition, this type of interaction method can be applied not only to display abnormalities of a database system, but also to the field of manual annotation of machine learning. Using this method of annotation can effectively save the time of operation and maintenance persons for annotating abnormalities and can allow the accumulation of more samples using the same amount of time, thus improving the efficiency of model training.

Using the present disclosure, problem analysis result data is generated according to abnormality indicators, and then a directed alert graph that can indicate causal relationships between causes of abnormality and abnormal phenomena is generated according to the problem analysis result data. Using this type of directed graph method to interact with a user enables the user to intuitively determine the cause of abnormality, and conveniently and concisely view various abnormal phenomena caused by such cause of abnormality, so that the abnormality can be quickly eliminated. Giving an alert through this type of directed alert graph makes interactions with a user more intuitive, fast, and concise, thus improving the efficiency of interaction.

The data processing method in implementations may be executed by any appropriate electronic device with data processing capabilities, including but not limited to: a server, a mobile terminal (such as a tablet computer, a mobile phone, etc.), a PC, and the like.

Figure 3:
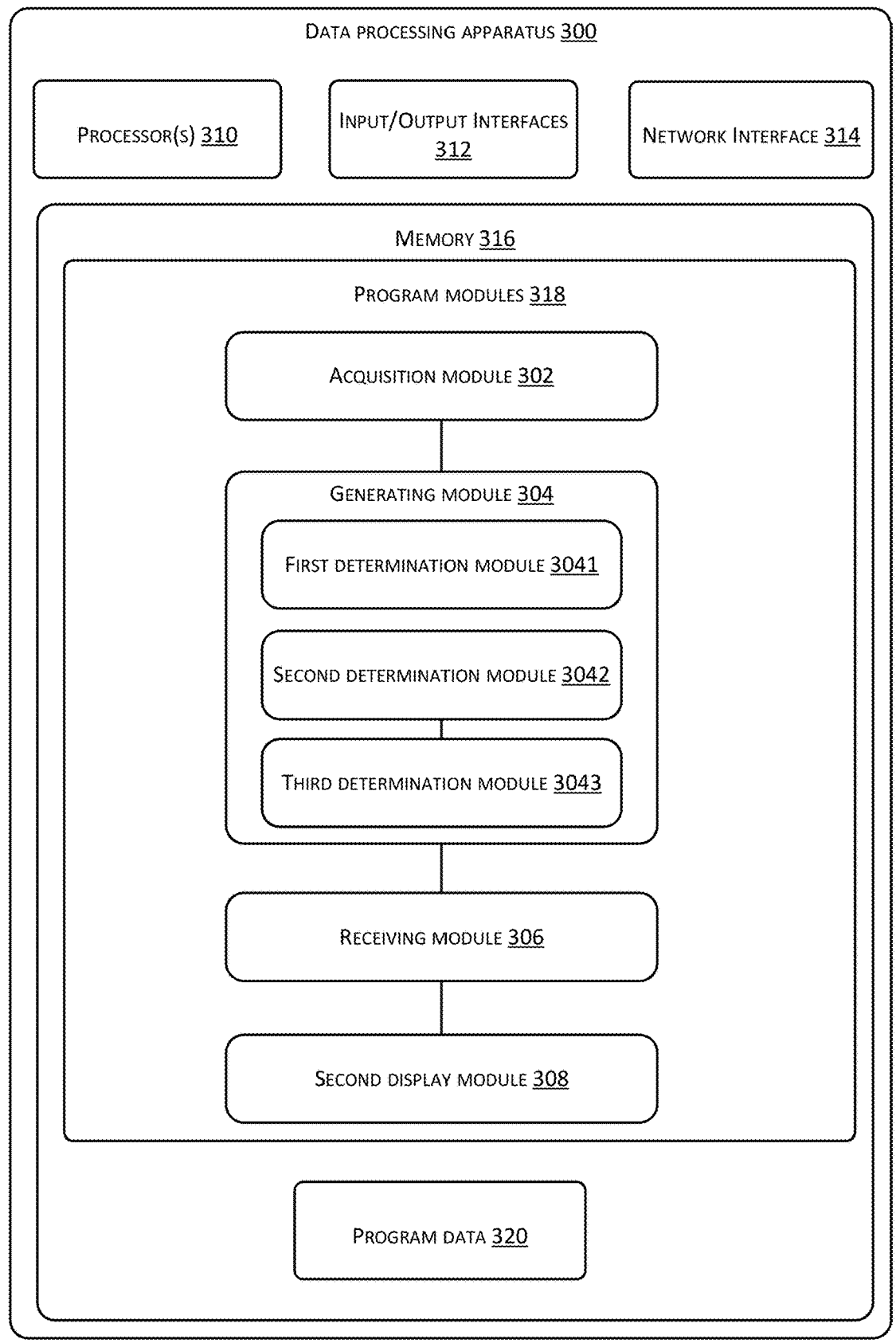
FIG. 3 is a structural block diagram of a data processing apparatus according to the embodiments of the present disclosure.

Referring to FIG. 3, a structural block diagram of a data processing apparatus 300 according to the embodiments of the present disclosure is shown.

In implementations, the data processing apparatus 300 includes: an acquisition module 302 configured to obtain problem analysis result data generated according to abnormality indicators of a database system, wherein the problem analysis results include associated abnormality indicators that are related in abnormality indicators and abnormality propagation relationships between the associated abnormality indicators; and a generating module 304 configured to generate a directed alert graph used for displaying causal relationships between causes of abnormality corresponding to the associated abnormality indicators and abnormal phenomena based on the associated abnormality indicators and the abnormality propagation relationships between the associated abnormality indicators.

In implementations, the generating module 304 includes: a first determination module 3041 configured to determine a root abnormality indicator and remaining abnormality indicators from the associated abnormality indicators according to the abnormality propagation relationships between the associated abnormality indicators; a second determination module 3042 configured to determine a cause of abnormality corresponding to the root abnormality indicator according to category information to which the root abnormality indicator belongs, and determine abnormal phenomena corresponding to the remaining abnormality indicators and propagation directions between the abnormal phenomena based on respective category information to which the remaining abnormality indicators belong and propagation directions between the remaining abnormality indicators; and a third determination module 3043 configured to generate the directed alert graph used for displaying the causal relationships between the causes of abnormality and the abnormal phenomena based on the cause of abnormality corresponding to the root abnormality indicator, the abnormal phenomena corresponding to the remaining abnormality indicators, and the propagation directions between the abnormal phenomena.

In implementations, the directed alert graph includes a first visualization object corresponding to the cause of abnormality, and second visualization objects corresponding to the remaining causes in preset candidate causes other than the cause of abnormality. The first visualization object is distinguished from the second visualization objects. Additionally or alternatively, the directed alert graph further includes a third visualization object corresponding to the abnormal phenomenon and fourth visualization objects corresponding to remaining phenomena in preset candidate phenomena other than the abnormal phenomenon. The third visualization object is distinguished from the fourth visualization objects.

In implementations, the apparatus further includes: a receiving module 306 configured to receive a triggering operation for the first visualization object or the third visualization object in the directed alert graph displayed; a second display module 308 configured to display information of an abnormality indicator corresponding to a cause of abnormality indicated by the triggered first visualization object, or information of an abnormality indicator corresponding to an abnormal phenomenon indicated by the triggered third visualization object according to the triggering operation.

In implementations, the information of the abnormality indicator includes at least one of the following: an identification of the abnormality indicator and an identification of fluctuation used for representing a direction of abnormal fluctuation of the abnormality indicator.

In implementations, the cause of abnormality includes at least one of the following: abnormal instance workload, a host problem and an external operation problem.

In implementations, the abnormal instance workload includes at least one of the following: a CPU intensive workload, an IO intensive workload, and a faulty structured query statement.

In implementations, the host problem includes at least one of the following: a host CPU bottleneck, a host IO bottleneck, a host memory bottleneck, a host network bottleneck, a host storage bottleneck, and a host hardware problem.

In implementations, the external operation problem includes at least one of the following: an instance parameter adjustment problem, an instance master/slaveswitch operations problem, an instance migration/backuptasks problem, and a host operation tasks problem.

In implementations, the abnormal phenomenon includes at least one of the following: a sudden increase in instance CPU, a sudden increase in instance IO, an instance memory overflow, a host CPU resource preemption, a host IO resource preemption, a host memory resource preemption, a host network resource preemption, an abnormal change in host space, a sudden increase of number of sessions, a sudden increase in TCP response time, and a decrease in service traffic (traffic drop).

In implementations, the apparatus 300 may further include one or more processors 310, an input/output interface 312, a network interface 314, and memory 316.

The memory 316 may include a form of computer readable media such as a volatile memory, a random access memory (RAM) and/or a non-volatile memory, for example, a read-only memory (ROM) or a flash RAM. The memory 316 is an example of a computer readable media. In implementations, the memory 316 may include program modules 318 and program data 320. The program modules 318 may include one or more of the foregoing modules as described in the foregoing embodiments and shown in FIG. 3.

The computer readable media may include a volatile or non-volatile type, a removable or non-removable media, which may achieve storage of information using any method or technology. The information may include a computer-readable instruction, a data structure, a program module or other data. Examples of computer storage media include, but not limited to, phase-change memory (PRAM), static random access memory (SRAM), dynamic random access memory (DRAM), other types of random-access memory (RAM), read-only memory (ROM), electronically erasable programmable read-only memory (EEPROM), quick flash memory or other internal storage technology, compact disk read-only memory (CD-ROM), digital versatile disc (DVD) or other optical storage, magnetic cassette tape, magnetic disk storage or other magnetic storage devices, or any other non-transmission media, which may be used to store information that may be accessed by a computing device. As defined herein, the computer readable media does not include transitory media, such as modulated data signals and carrier waves.

In implementations, the data processing apparatus is used to implement the corresponding data processing methods in the foregoing multiple method embodiments, and has the beneficial effects of the corresponding method embodiments, which will not be repeated herein. In addition, for the functional implementations of each module in the data processing apparatus, reference may be made to the description of the corresponding parts in the foregoing method embodiments, which will not be repeated herein.

Figure 4:
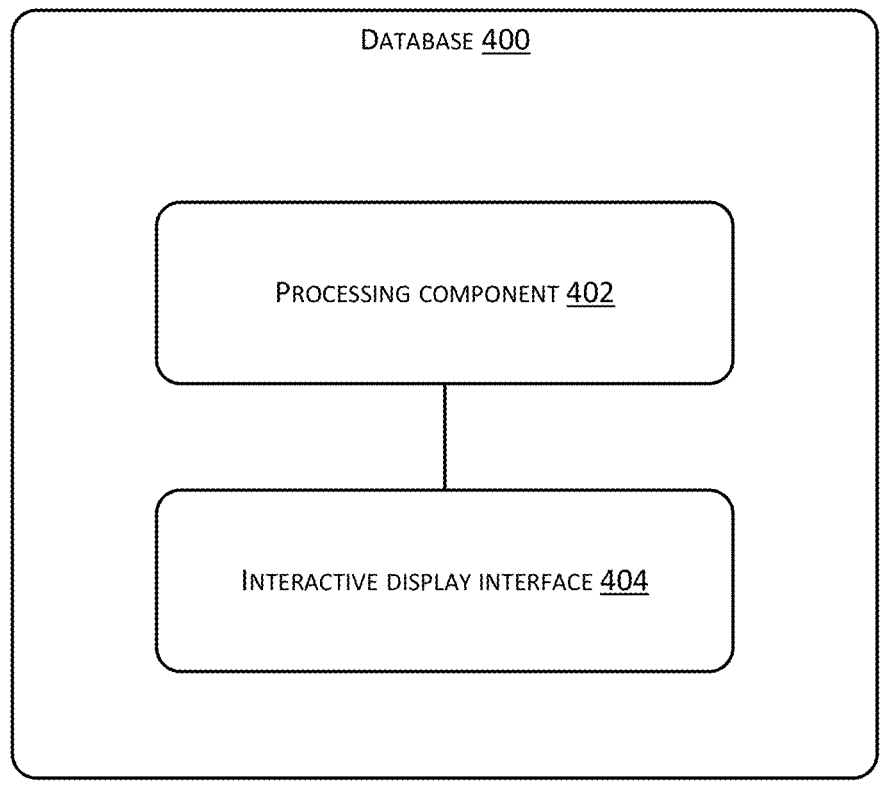
FIG. 4 is a structural block diagram of a database system according to the embodiments of the present disclosure.

Referring to FIG. 4, a structural block diagram of a database 400 according to the embodiments of the present disclosure is shown.

As shown in FIG. 4, the database system 400 includes: a processing component 402 configured to obtain problem analysis result data that is generated according to abnormality indicators of the database system, wherein the problem analysis results include the abnormality indicators that are related in abnormality indicators and abnormality propagation relationships between the associated abnormality indicators; and an interactive display interface 404 configured to display a directed alert graph, the alert graph being generated based on the associated abnormality indicators and the abnormality propagation relationships between the associated abnormality indicators.

The processing component 402 of the database can generate problem analysis result data according to abnormality indicators of the database. The interactive display interface 404 can generate a directed alert graph according to the associated abnormality indicators in the problem analysis result data and abnormality propagation relationships between the associated abnormality indicators, and display the directed alert graph, so that a user can intuitively determine a cause of abnormality and a phenomenon corresponding to the abnormality according to direction(s) in the directed alert graph, so as to quickly locate the cause and conveniently solve the abnormality.

In order to display more clearly and intuitively, the directed alert graph is displayed in the interactive display interface through a multi-layer display interface. The multi-layer display interface includes a plurality of display layers, and the display layers are used to display a cause of abnormality or abnormal phenomenon of a corresponding layer in the directed alert graph. The layer of the cause of abnormality and the abnormal phenomenon is determined according to the abnormality propagation relationships.

For example, referring to FIG. 2d, the display layers in the multi-layer display interface are arranged sequentially from left to right. The first two display layers on the left are used to display causes of abnormality, which are a first display layer used for displaying the root cause and a second display layer used for displaying an initial root cause in turn. The remaining display layers are used for displaying abnormal phenomena. According to propagation relationships between the abnormal phenomena in the example, a third display layer is used to display abnormal phenomena of a resource layer, a fourth display layer is used to display abnormal phenomena of a session layer, a fifth display layer is used to display abnormal phenomena of a TCP layer, and a sixth display layer is used to display overload phenomena respectively.

At least some of these display layers have display sub-layers. For example, referring to FIG. 2e, the second display layer has display sub-layers, and the display sub-layers can be hidden or displayed according to the user's operation. When the user clicks on the first visualization object (such as the host CPU bottleneck) that corresponds to the cause of abnormality and is displayed in the second display layer, a corresponding display sub-layer (such as the label shown in FIG. 2e) is triggered to be displayed.

In this way, the multi-layer display of the directed alert graph is realized, which not only enables users to not only intuitively understand information such as causes of abnormality, abnormal phenomena, etc., but also view specific content of the causes of abnormality and/or abnormality indicators corresponding to the abnormal phenomena as needed, which makes the functions to be more rich and is able to meet different needs of users.

Figure 5:
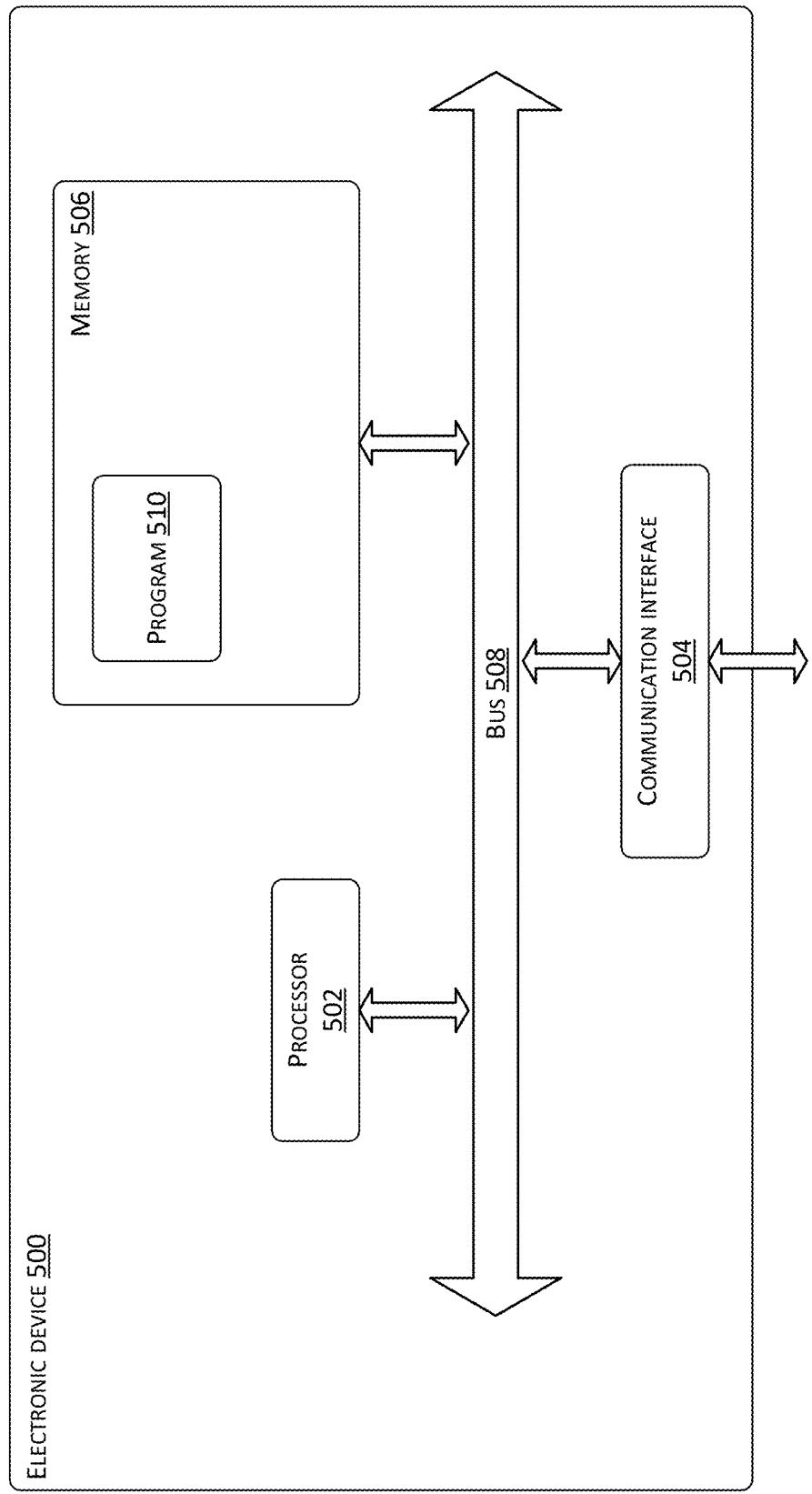
FIG. 5 is a schematic structural diagram of an electronic device according to the embodiments of the present disclosure.

Referring to FIG. 5, a schematic structural diagram of an electronic device 500 according to a fifth embodiment of the present disclosure is shown. Specific embodiments of the present disclosure do not limit specific implementations of the electronic device.

As shown in FIG. 5, the electronic device 500 may include: a processor (processor) 502, a communication interface 504, a memory 506, and a communication bus 508.

The processor 502, the communication interface 504 and the memory 506 communicate with each other through the communication bus 508.

The communication interface 504 is configured to communicate with other electronic devices such as terminal devices or servers.

The processor 502 is configured to execute a program 510, and specifically may execute relevant steps in the foregoing data processing method embodiments.

Specifically, the program 510 may include program codes including computer operation instructions.

The processor 502 may be a central processing unit (CPU), or an application specific integrated circuit (ASIC), or one or more integrated circuits configured to implement the embodiments of the present disclosure. The one or more processors included in the electronic device may be the same type of processors, such as one or more CPUs, or may be different types of processors, such as one or more CPUs and one or more ASICs.

The memory 506 is configured to store the program 510. The memory 506 may include high-speed RAM memory, and may also include non-volatile memory, such as at least one magnetic storage device.

The program 510 may specifically be configured to cause the processor 502 to perform the following operations: obtaining problem analysis result data generated according to abnormality indicators of a database system, wherein the problem analysis results include associated abnormality indicators that are related in abnormality indicators and abnormality propagation relationships between the associated abnormality indicators; and generating a directed alert graph used for displaying causal relationships between causes of abnormality corresponding to the associated abnormality indicators and abnormal phenomena based on the associated abnormality indicators and the abnormality propagation relationships between the associated abnormality indicators.

In implementations, when generating the directed alert graph used for displaying the causal relationships between the causes of abnormality corresponding to the associated abnormality indicators and the abnormal phenomena based on the associated abnormality indicators and the abnormality propagation relationships between the associated abnormality indicators, the program 510 is further configured to cause the processor 502 to determine a root abnormality indicator and remaining abnormality indicators in the associated abnormality indicators according to the abnormality propagation relationships between the associated abnormality indicators; determine a cause of abnormality corresponding to the root abnormality indicator according to category information to which the root abnormality indicator belongs, and determine abnormal phenomena corresponding to the remaining abnormality indicators and propagation directions between the abnormal phenomena according to respective category information to which the remaining abnormality indicators belong and propagation directions between the remaining abnormality indicators; and generate the directed alert graph used for displaying the causal relationships between the causes of abnormality and the abnormal phenomena based on the cause of abnormality corresponding to the root abnormality indicator, the abnormal phenomena corresponding to the remaining abnormality indicators, and the propagation directions between the abnormal phenomena.

In implementations, the directed alert graph includes a first visualization object corresponding to the cause of abnormality, and second visualization objects corresponding to the remaining causes in preset candidate causes other than the cause of abnormality, the first visualization object being distinguished from the second visualization objects; and/or the directed alert graph further includes a third visualization object corresponding to the abnormal phenomenon and fourth visualization objects corresponding to remaining phenomena in preset candidate phenomena other than the abnormal phenomenon, the third visualization object being distinguished from the fourth visualization objects.

In implementations, the program 510 is further configured to cause the processor 502 to receive a triggering operation for the first visualization object or the third visualization object in the directed alert graph displayed; and display information of an abnormality indicator corresponding to a cause of abnormality indicated by the triggered first visualization object, or information of an abnormality indicator corresponding to an abnormal phenomenon indicated by the triggered third visualization object according to the triggering operation.

In implementations, the information of the abnormality indicator includes at least one of the following: an identification of the abnormality indicator and an identification of fluctuation used for representing a direction of abnormal fluctuation of the abnormality indicator.

In implementations, the cause of abnormality includes at least one of the following: abnormal instance workload, a host problem and an external operation problem.

In an optional implementation, the abnormal instance workload includes at least one of the following: a CPU intensive workload, an IO intensive workload, and a faulty structured query statement.

In implementations, the host problem includes at least one of the following: a host CPU bottleneck, a host IO bottleneck, a host memory bottleneck, a host network bottleneck, a host storage bottleneck, and a host hardware problem.

In implementations, the external operation problem includes at least one of the following: an instance parameter adjustment problem, an instance master/slaveswitch operations problem, an instance migration/backuptasks problem, and a host operation tasks problem.

In implementations, the abnormal phenomenon includes at least one of the following: a sudden increase in instance CPU, a sudden increase in instance IO, an instance memory overflow, a host CPU resource preemption, a host IO resource preemption, a host memory resource preemption, a host network resource preemption, an abnormal change in host space, a sudden increase of number of sessions, a sudden increase in TCP response time, and a decrease in service traffic.

Specific implementations of the steps in the program 510, reference may be made to the descriptions of the corresponding steps and units in the above data processing method embodiments, which will not be repeated herein. One skilled in the art can clearly understand that, for the convenience and brevity of description, specific working processes of the above-described devices and modules can be referenced to the corresponding process descriptions of the foregoing method embodiments, which will not be repeated herein.

Through the electronic device described in the present disclosure, problem analysis result data is generated according to abnormality indicators, and then a directed alert graph that can indicate causal relationships between causes of abnormality and abnormal phenomena is generated according to the problem analysis result data. Using this type of directed graph method to interact with a user enables the user to intuitively determine the cause of abnormality, and conveniently and concisely view various abnormal phenomena caused by such cause of abnormality, so that the abnormality can be quickly eliminated. Giving an alert through this type of directed alert graph makes interactions with a user more intuitive, fast, and concise, thus improving the efficiency of interaction.

It needs to be pointed out that, according to the needs of implementation, each component/step described in the embodiments of the present disclosure may be split into more components/steps, or two or more components/steps or some operations of components/steps may be combined into new components/steps to achieve the purpose of the embodiments of the present disclosure.

The foregoing methods according to the embodiments of the present disclosure may be implemented in hardware, firmware, or implemented as software or computer codes that may be stored in a recording medium (such as CD ROM, RAM, a floppy disk, a hard disk, or a magneto-optical disk), or implemented as computer codes that are originally stored in a remote recording medium or non-transitory machine-readable medium and are downloaded and stored in a local recording medium through a network. As such, the methods described herein can be processed by software stored in a recording medium using a general-purpose computer, a special-purpose processor or a programmable or special-purpose hardware (such as ASIC or FPGA). It is understood that a computer, a processor, a microprocessor controller or programmable hardware includes storage components (e.g., RAM, ROM, flash memory, etc.) that can store or receive software or computer codes. When the software or computer codes are accessed and executed by a computer, a processor or hardware, the data processing methods described herein are implemented. Furthermore, when a general-purpose computer accesses codes used for implementing the data processing methods described herein, an execution of the codes converts the general-purpose computer into a special-purpose computer used for executing the data processing methods described herein.

One of ordinary skill in the art can realize that the units and the method steps of each example described in conjunction with the embodiments disclosed herein can be implemented in electronic hardware, or a combination of computer software and electronic hardware. Whether these functions are performed in form of hardware or software depends on specific application and design constraints of the technical solutions. One skilled in the art may implement the described functions using different methods for each particular application, but such implementations should not be considered to go beyond the scope of the embodiments of the present disclosure.

The above implementations are only used to illustrate the embodiments of the present disclosure, and do not limit the embodiments of the present disclosure. One of ordinary skill in the relevant technical field can make various changes and modifications without departing the spirit and scope of the embodiments of the present disclosure. Therefore, all equivalent technical solutions also belong to the scope of the embodiments of the present disclosure, and the scope of patent protection of the embodiments of the present disclosure should be defined by the claims.

The present disclosure can be further understood using the following clauses.

Clause 1: A data processing method comprising: obtaining problem analysis result data generated according to abnormality indicators of a database system, wherein the problem analysis result data includes associated abnormality indicators that are related in abnormality indicators and abnormality propagation relationships between the associated abnormality indicators; and generating a directed alert graph used for displaying causal relationships between causes of abnormality corresponding to the associated abnormality indicators and abnormal phenomena based on the associated abnormality indicators and the abnormality propagation relationships between the associated abnormality indicators.

Clause 2: The method according to Clause 1, wherein generating the directed alert graph used for displaying the causal relationships between the causes of abnormality corresponding to the associated abnormality indicators and the abnormal phenomena based on the associated abnormality indicators and the abnormality propagation relationships between the associated abnormality indicators comprises: determining a root abnormality indicator and remaining abnormality indicators in the associated abnormality indicators according to the abnormality propagation relationships between the associated abnormality indicators; determining a cause of abnormality corresponding to the root abnormality indicator according to category information to which the root abnormality indicator belongs; determining abnormal phenomena corresponding to the remaining abnormality indicators and propagation directions between the abnormal phenomena according to respective category information to which the remaining abnormality indicators belong and propagation directions between the remaining abnormality indicators; and generating the directed alert graph used for displaying the causal relationships between the causes of abnormality and the abnormal phenomena based on the cause of abnormality corresponding to the root abnormality indicator, the abnormal phenomena corresponding to the remaining abnormality indicators, and the propagation directions between the abnormal phenomena.

Clause 3: The method according to Clause 2, wherein the directed alert graph comprises a first visualization object corresponding to the cause of abnormality, and second visualization objects corresponding to the remaining causes in preset candidate causes other than the cause of abnormality, the first visualization object being distinguished from the second visualization objects; and/or the directed alert graph further comprises a third visualization object corresponding to an abnormal phenomenon of the abnormal phenomena and fourth visualization objects corresponding to remaining phenomena in preset candidate phenomena other than the abnormal phenomenon, the third visualization object being distinguished from the fourth visualization objects.

Clause 4: The method according to Clause 3, further comprising: receiving a triggering operation for the first visualization object or the third visualization object in the directed alert graph displayed; and displaying information of an abnormality indicator corresponding to a cause of abnormality indicated by the triggered first visualization object, or information of an abnormality indicator corresponding to an abnormal phenomenon indicated by the triggered third visualization object according to the triggering operation.

Clause 5: The method according to Clause 4, wherein the information of the abnormality indicator comprises at least one of: an identification of the abnormality indicator and an identification of fluctuation used for representing a direction of abnormal fluctuation of the abnormality indicator.

Clause 6: The method according to any one of Clauses 1-5, wherein the cause of abnormality comprises at least one of: abnormal instance workload, a host problem and an external operation problem.

Clause 7: The method according to Clause 6, wherein the abnormal instance workload comprises at least one of: a CPU intensive workload, an IO intensive workload, and a faulty structured query statement.

Clause 8: The method according to Clause 6, wherein the host problem comprises at least one of: a host CPU bottleneck, a host IO bottleneck, a host memory bottleneck, a host network bottleneck, a host storage bottleneck, and a host hardware problem.

Clause 9: The method according to Clause 6, wherein the external operation problem comprises at least one of: an instance parameter adjustment problem, an instance master/slaveswitch operations problem, an instance migration/backuptasks problem, and a host operation tasks problem.

Clause 10: The method according to Clause 1, wherein the abnormal phenomena comprise at least one of: a sudden increase in instance CPU, a sudden increase in instance IO, an instance memory overflow, a host CPU resource preemption, a host IO resource preemption, a host memory resource preemption, a host network resource preemption, an abnormal change in host space, a sudden increase of number of sessions, a sudden increase in TCP response time, and a decrease in service traffic.

Clause 11: A data processing apparatus comprising: an acquisition module configured to obtain problem analysis result data generated according to abnormality indicators of a database system, wherein the problem analysis result data includes associated abnormality indicators that are related in abnormality indicators and abnormality propagation relationships between the associated abnormality indicators; and a generating module configured to generate a directed alert graph used for displaying causal relationships between causes of abnormality corresponding to the associated abnormality indicators and abnormal phenomena based on the associated abnormality indicators and the abnormality propagation relationships between the associated abnormality indicators; and a display module configured to display the directed alert graph for giving an alert.

Clause 12: An electronic device comprising: a processor, a memory, a communication interface, and a communication bus, wherein the processor, the memory, and the communication interface communicate with each other through the communication bus, the memory is used for storing at least one executable instruction, and the executable instruction causes the processor to perform operations corresponding to the data processing method according to any one of Clauses 1-10.

Clause 13: A computer storage medium, on which a computer program is stored, the program when executed by a processor, implementing the data processing method according to any one of Clauses 1-10.

Clause 14: A database system comprising: a processing component configured to obtain data of a problem analysis result generated according to abnormality indicators of the database system, wherein the problem analysis result includes the abnormality indicators that are related in abnormality indicators and abnormality propagation relationships between the associated abnormality indicators; and an interactive display interface configured to display a directed alert graph, the alert graph being generated based on the associated abnormality indicators and the abnormality propagation relationships between the associated abnormality indicators.

Clause 15: The database system according to Clause 14, wherein the directed alert graph is displayed in the interactive display interface through a multi-layer display interface, the multi-layer display interface includes a plurality of display layers, the display layers are used to display a cause of abnormality or abnormal phenomenon of a corresponding layer in the directed alert graph, and the layer of the cause of abnormality and the abnormal phenomenon is determined according to the abnormality propagation relationships.

What is claimed is:

1. A method implemented by a computing device, the method comprising:
obtaining problem analysis result data generated according to abnormality indicators of a database system, wherein the problem analysis result data includes associated abnormality indicators that are related in a plurality of abnormality indicators and abnormality propagation relationships between the associated abnormality indicators; and
generating a directed alert graph used for displaying causal relationships between causes of abnormality corresponding to the associated abnormality indicators and abnormal phenomena based on the associated abnormality indicators and the abnormality propagation relationships between the associated abnormality indicators, wherein a cause of abnormality of the causes of abnormality comprises at least one of: an abnormal instance workload, a host problem and an external operation problem, and the abnormal instance workload comprises at least one of: a central processing unit (CPU) intensive workload, an input/output (IO) intensive workload, and a faulty structured query statement.

2. The method according to claim 1, wherein generating the directed alert graph used for displaying the causal relationships between the causes of abnormality corresponding to the associated abnormality indicators and the abnormal phenomena based on the associated abnormality indicators and the abnormality propagation relationships between the associated abnormality indicators comprises:
determining a root abnormality indicator and remaining abnormality indicators in the associated abnormality indicators according to the abnormality propagation relationships between the associated abnormality indicators;
determining the cause of abnormality corresponding to the root abnormality indicator according to category information to which the root abnormality indicator belongs;
determining abnormal phenomena corresponding to the remaining abnormality indicators and propagation directions between the abnormal phenomena according to respective category information to which the remaining abnormality indicators belong and propagation directions between the remaining abnormality indicators; and
generating the directed alert graph used for displaying the causal relationships between the causes of abnormality and the abnormal phenomena based on the cause of abnormality corresponding to the root abnormality indicator, the abnormal phenomena corresponding to the remaining abnormality indicators, and the propagation directions between the abnormal phenomena.

3. The method according to claim 2, wherein:
the directed alert graph comprises a first visualization object corresponding to the cause of abnormality, and second visualization objects corresponding to the remaining causes in preset candidate causes other than the cause of abnormality, the first visualization object being distinguished from the second visualization objects; and/or
the directed alert graph further comprises a third visualization object corresponding to an abnormal phenomenon of the abnormal phenomena and fourth visualization objects corresponding to remaining phenomena in preset candidate phenomena other than the abnormal phenomenon, the third visualization object being distinguished from the fourth visualization objects.

4. The method according to claim 3, further comprising:
receiving a triggering operation for the first visualization object or the third visualization object in the directed alert graph displayed; and
displaying information of an abnormality indicator corresponding to a cause of abnormality indicated by the triggered first visualization object, or information of an abnormality indicator corresponding to an abnormal phenomenon indicated by the triggered third visualization object according to the triggering operation.

5. The method according to claim 4, wherein the information of the abnormality indicator comprises at least one of: an identification of the abnormality indicator and an identification of fluctuation used for representing a direction of abnormal fluctuation of the abnormality indicator.

6. The method according to claim 1, wherein the host problem comprises at least one of: a host CPU bottleneck, a host IO bottleneck, a host memory bottleneck, a host network bottleneck, a host storage bottleneck, and a host hardware problem.

7. The method according to claim 1, wherein the external operation problem comprises at least one of: an instance parameter adjustment problem, an instance master/slaveswitch operations problem, an instance migration/backuptasks problem, and a host operation tasks problem.

8. The method according to claim 1, wherein the abnormal phenomena comprise at least one of: a sudden increase in instance CPU, a sudden increase in instance IO, an instance memory overflow, a host CPU resource preemption, a host IO resource preemption, a host memory resource preemption, a host network resource preemption, an abnormal change in host space, a sudden increase of number of sessions, a sudden increase in transmission control protocol (TCP) response time, and a decrease in service traffic.

9. One or more computer readable media storing executable instructions that, when executed by one or more processors, cause the one or more processors to perform acts comprising:
obtaining problem analysis result data generated according to abnormality indicators of a database system, wherein the problem analysis result data includes associated abnormality indicators that are related in a plurality of abnormality indicators and abnormality propagation relationships between the associated abnormality indicators; and
generating a directed alert graph used for displaying causal relationships between causes of abnormality corresponding to the associated abnormality indicators and abnormal phenomena based on the associated abnormality indicators and the abnormality propagation relationships between the associated abnormality indicators, wherein a cause of abnormality of the causes of abnormality comprises at least one of: an abnormal instance workload, a host problem and an external operation problem, and the external operation problem comprises at least one of: an instance parameter adjustment problem, an instance master/slaveswitch operations problem, an instance migration/backuptasks problem, and a host operation tasks problem.

10. The one or more computer readable media according to claim 9, wherein generating the directed alert graph used for displaying the causal relationships between the causes of abnormality corresponding to the associated abnormality indicators and the abnormal phenomena based on the associated abnormality indicators and the abnormality propagation relationships between the associated abnormality indicators comprises:
determining a root abnormality indicator and remaining abnormality indicators in the associated abnormality indicators according to the abnormality propagation relationships between the associated abnormality indicators;
determining the cause of abnormality corresponding to the root abnormality indicator according to category information to which the root abnormality indicator belongs;
determining abnormal phenomena corresponding to the remaining abnormality indicators and propagation directions between the abnormal phenomena according to respective category information to which the remaining abnormality indicators belong and propagation directions between the remaining abnormality indicators; and
generating the directed alert graph used for displaying the causal relationships between the causes of abnormality and the abnormal phenomena based on the cause of abnormality corresponding to the root abnormality indicator, the abnormal phenomena corresponding to the remaining abnormality indicators, and the propagation directions between the abnormal phenomena.

11. The one or more computer readable media according to claim 10, wherein:
the directed alert graph comprises a first visualization object corresponding to the cause of abnormality, and second visualization objects corresponding to the remaining causes in preset candidate causes other than the cause of abnormality, the first visualization object being distinguished from the second visualization objects; and/or
the directed alert graph further comprises a third visualization object corresponding to an abnormal phenomenon of the abnormal phenomena and fourth visualization objects corresponding to remaining phenomena in preset candidate phenomena other than the abnormal phenomenon, the third visualization object being distinguished from the fourth visualization objects.

12. The one or more computer readable media according to claim 11, the acts further comprising:
receiving a triggering operation for the first visualization object or the third visualization object in the directed alert graph displayed; and
displaying information of an abnormality indicator corresponding to a cause of abnormality indicated by the triggered first visualization object, or information of an abnormality indicator corresponding to an abnormal phenomenon indicated by the triggered third visualization object according to the triggering operation.

13. The one or more computer readable media according to claim 12, wherein the information of the abnormality indicator comprises at least one of: an identification of the abnormality indicator and an identification of fluctuation used for representing a direction of abnormal fluctuation of the abnormality indicator.

14. The one or more computer readable media according to claim 9, wherein:
the abnormal instance workload comprises at least one of: a CPU intensive workload, an IO intensive workload, and a faulty structured query statement;
the host problem comprises at least one of: a host CPU bottleneck, a host IO bottleneck, a host memory bottleneck, a host network bottleneck, a host storage bottleneck, and a host hardware problem.

15. The one or more computer readable media according to claim 9, wherein the abnormal phenomena comprise at least one of: a sudden increase in instance CPU, a sudden increase in instance IO, an instance memory overflow, a host CPU resource preemption, a host IO resource preemption, a host memory resource preemption, a host network resource preemption, an abnormal change in host space, a sudden increase of number of sessions, a sudden increase in transmission control protocol (TCP) response time, and a decrease in service traffic.

16. A database system comprising:

a processing component comprising one or more processors, the processing component being configured to obtain data of a problem analysis result generated according to a plurality of abnormality indicators of the database system, wherein the problem analysis result includes the associated abnormality indicators that are related in the plurality of abnormality indicators and abnormality propagation relationships between the associated abnormality indicators; and an interactive display interface configured to display a directed alert graph, the alert graph being generated based on the associated abnormality indicators and the abnormality propagation relationships between the associated abnormality indicators, wherein the directed alert graph is displayed in the interactive display interface through a multi-layer display interface, the multi-layer display interface includes a plurality of display layers, the display layers are used to display a cause of abnormality or abnormal phenomenon of a corresponding layer in the directed alert graph, and the corresponding layer of the cause of abnormality or the abnormal phenomenon is determined according to the abnormality propagation relationships.

* * * * *